(12) United States Patent
Lawrence

(10) Patent No.: US 11,335,138 B2
(45) Date of Patent: May 17, 2022

(54) SYSTEM AND METHOD FOR TIRE EMBEDDED OBJECT DETECTION

(71) Applicant: GM GLOBAL TECHNOLOGY OPERATIONS LLC, Detroit, MI (US)

(72) Inventor: Scott D. Lawrence, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 475 days.

(21) Appl. No.: 16/425,379

(22) Filed: May 29, 2019

(65) Prior Publication Data

US 2020/0380803 A1 Dec. 3, 2020

(51) Int. Cl.
*G07C 5/08* (2006.01)
*B60C 23/04* (2006.01)
*H04L 67/12* (2022.01)

(52) U.S. Cl.
CPC ........ *G07C 5/0816* (2013.01); *B60C 23/0433* (2013.01); *B60C 23/0488* (2013.01); *G07C 5/0808* (2013.01); *H04L 67/12* (2013.01)

(58) Field of Classification Search
CPC .......................... G07C 5/0816; G07C 5/0808; B60C 23/0433; B60C 23/0488; B60C 19/12; B60C 2019/004; B60C 23/04; H04L 67/12
See application file for complete search history.

(56) References Cited

U.S. PATENT DOCUMENTS

2006/0222120 A1\* 10/2006 Yegin .................. B60C 23/0444
375/347

\* cited by examiner

*Primary Examiner* — Michael V Kerrigan
(74) *Attorney, Agent, or Firm* — Quinn IP Law

(57) ABSTRACT

A method of performing a diagnostic test on a vehicle having at least one tire includes providing the vehicle with at least one sensor configured to detect a vehicle operating characteristic, a receiver configured to receive AM signals, a notification system, and a controller in electronic communication with the at least one sensor, the receiver, and the notification system, receiving sensor data from the at least one sensor and AM signal data from the receiver, analyzing the sensor data and the AM signal data, determining whether a first condition is satisfied, and in response to the first condition being satisfied, generating a first control signal to control the notification system to generate a notification.

20 Claims, 3 Drawing Sheets

SYSTEM AND METHOD FOR TIRE EMBEDDED OBJECT DETECTION

The present disclosure relates generally to the detection of objects embedded in a tire tread.

Various systems, such as tire pressure monitoring systems, can provide notification to the operator of a vehicle of a low tire pressure condition which can be caused by a foreign object embedded in a tire tread, such as a nail or screw. This notification to the operator allows the operator to seek service and repair to prevent further damage to or failure of the tire. However, these systems detect low tire pressure and cannot detect the cause of the low-pressure issue. Further, these systems cannot detect an issue with the tire unless there is a low-pressure condition.

SUMMARY

Embodiments according to the present disclosure provide a number of advantages. For example, embodiments according to the present disclosure enable detection of a foreign object embedded in a tire tread.

In an exemplary embodiment of the present disclosure, a method of controlling an automotive vehicle includes providing a vehicle with at least one tire, at least one sensor configured to detect a vehicle operating characteristic, a receiver configured to receive AM signals, a notification system, and a controller in electronic communication with the at least one sensor, the receiver, and the notification system. The method also includes receiving, by the controller, sensor data from the at least one sensor and AM signal data from the receiver and determining, by the controller, whether a first condition is satisfied. The method also includes, in response to the first condition being satisfied, analyzing, by the controller, the sensor data and the AM signal data and determining, by the controller, whether a second condition is satisfied. The method further includes, in response to the second condition being satisfied, generating, by the controller, a first control signal to control the notification system to generate a notification.

In some aspects, the at least one sensor includes a first sensor configured to generate first sensor data and a second sensor configured to generate second sensor data, and the first sensor is a vehicle speed sensor configured to generate vehicle speed data and the second sensor is a tire pressure sensor configured to generate tire pressure data.

In some aspects, the first condition is satisfied when the tire pressure data indicates that a tire pressure of the at least one tire is below a predetermined threshold.

In some aspects, analyzing the sensor data and the AM signal data includes comparing the AM signal data to the vehicle speed data over a predetermined time period.

In some aspects, the second condition is satisfied when the AM signal data is a function of a vehicle speed indicated by the vehicle speed data.

In some aspects, the method further includes, in response to the second condition not being satisfied, generating, by the controller, a second control signal to control the notification system to generate a low tire pressure notification to the vehicle operator.

In some aspects, the first control signal controls the notification system to generate the notification notifying the vehicle operator of a detected foreign object in the at least one tire.

In an exemplary embodiment of the present disclosure, a method of performing a diagnostic test on a vehicle having at least one tire includes providing the vehicle with at least one sensor configured to detect a vehicle operating characteristic, a receiver configured to receive AM signals, a notification system, and a controller in electronic communication with the at least one sensor, the receiver, and the notification system. The method also includes receiving, by the controller, sensor data from the at least one sensor and AM signal data from the receiver. The method further includes analyzing, by the controller, the sensor data and the AM signal data. The method also includes determining, by the controller, whether a first condition is satisfied, and, in response to the first condition being satisfied, generating, by the controller, a first control signal to control the notification system to generate a notification.

In some aspects, the at least one sensor includes a first sensor configured to generate first sensor data and the first sensor is a vehicle speed sensor configured to generate vehicle speed data.

In some aspects, analyzing the sensor data and the AM signal data includes comparing the AM signal data to the vehicle speed data over a predetermined time period.

In some aspects, the first condition is satisfied when the AM signal data is a function of a vehicle speed indicated by the vehicle speed data.

In some aspects, the first control signal controls the notification system to generate the notification indicative of a detected foreign object in the at least one tire.

In an exemplary embodiment of the present disclosure, a system for detecting a foreign object embedded in a tire tread includes at least one sensor configured to detect a vehicle operating characteristic, a receiver configured to receive AM signals, a notification system, and a controller in electronic communication with the at least one sensor, the receiver, and the notification system. The controller is configured to receive sensor data from the at least one sensor and AM signal data from the receiver, analyze the sensor data and the AM signal data by comparing the AM signal data to vehicle speed data over a predetermined time period, determine whether a first condition is satisfied, in response to the first condition being satisfied, analyze the sensor data and the AM signal data, and generate a control signal to control the notification system to generate a notification.

In some aspects, the controller is further configured to determine whether a second condition is satisfied and in response to the second condition being satisfied, generate the control signal to control the notification system to generate the notification.

In some aspects, the notification is transmitted to one or more of a vehicle operator, a vehicle passenger, a remote vehicle operator, and an autonomous driving system.

In some aspects, the first condition is satisfied when the tire pressure data indicates that a tire pressure of the at least one tire is below a predetermined threshold.

In some aspects, the second condition is satisfied when the AM signal data is a function of a vehicle speed indicated by the vehicle speed data.

BRIEF DESCRIPTION OF THE DRAWINGS

The present disclosure will be described in conjunction with the following figures, wherein like numerals denote like elements.

Figure 1:
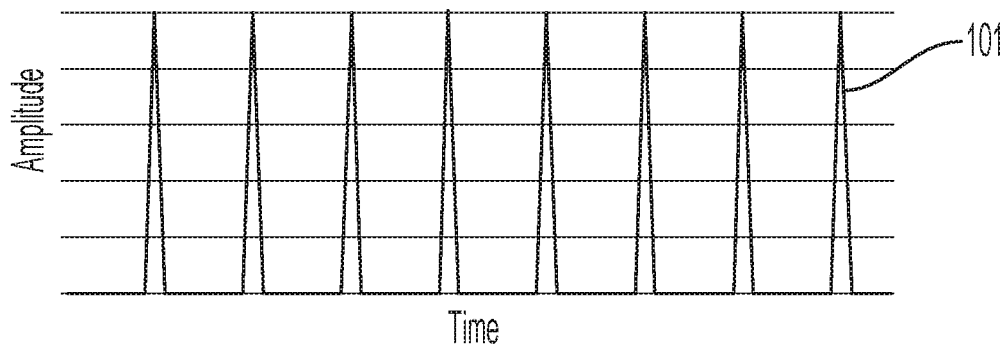
FIG. 1 is a graphical representation of an AM signal as a function of vehicle speed resulting from grounding effects due to a foreign object embedded in a tire, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above derivatives thereof, and words of similar import.

When a foreign object is embedded in a tire tread, the connection of the foreign object with the ground creates a grounding signal that can be received by an AM radio signal receiver. This grounding signal is created across all AM frequencies. Analysis of the AM signal relative to the known vehicle speed can remotely detect the presence of an embedded foreign object without relying on tire pressure monitoring systems which may only detect a low-pressure condition of the tire. As shown in FIG. 1, a periodic signal 101 is generated when an embedded object in a tire repeatedly contacts the ground, creating a grounding signal that is received by an AM receiver. The periodicity of the signal depends on the vehicle speed. Given a known vehicle speed and tire size, signals received by an AM receiver of the vehicle can be analyzed to determine if the signal originates due to the repeated contact of a foreign object with the ground as the tire rotates.

Figure 2:
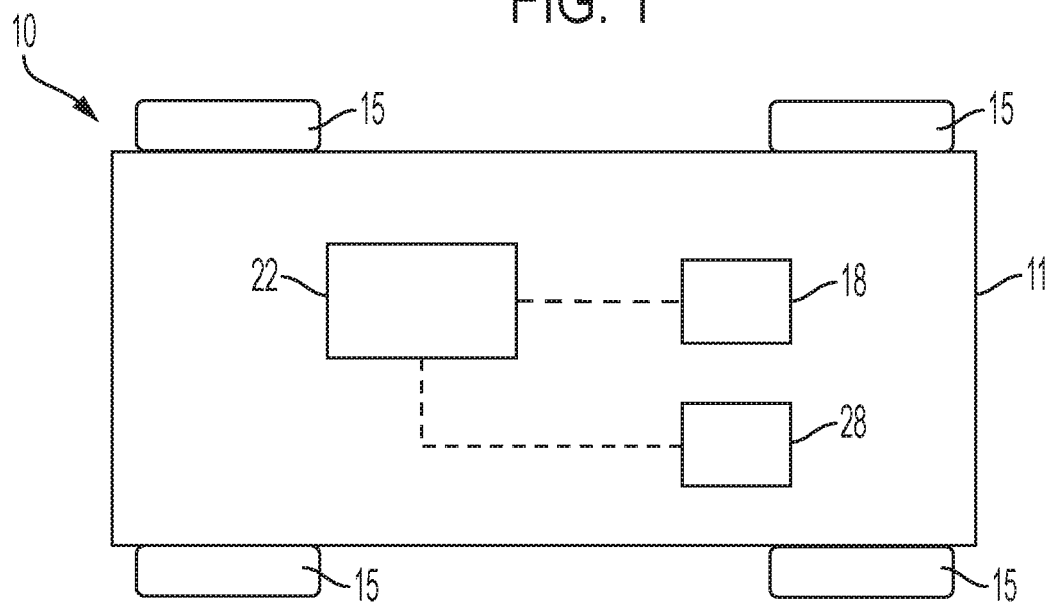
FIG. 2 is a schematic illustration of a vehicle including a system to detect a foreign object embedded in a tire, according to an embodiment.

FIG. 2 schematically illustrates an automotive vehicle 10 according to the present disclosure. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used. Further, the systems disclosed herein may also be used with any of the tires of a trailer or other towed vehicle physically and/or electronically connected to a tow vehicle. In various embodiments, the vehicle 10 is an autonomous or semi-autonomous vehicle in which driving control is provided with less driver intervention. The systems disclosed herein may be used with various automated driver-assistance systems, such as cruise control, adaptive cruise control, or true "driverless" vehicles corresponding to higher automation levels.

The vehicle 10 generally includes a body 11 and wheels including tires 15. The body 11 encloses the other components of the vehicle 10 and also defines a passenger compartment. The tires 15 are each rotationally coupled to the body 11 near a respective corner of the body 11.

The vehicle 10 includes at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 is in electronic communication with a notification system 18. In various embodiments, the notification system 18 is a system to notify the operator or passenger of a detected issue with the vehicle 10. In various embodiments, the notification system 18 includes a display (not shown), a speaker (not shown), or other audiovisual communication device to communicate information to the vehicle operator. In various embodiments, the notification system 18 is included with or in communication with an infotainment system of the vehicle 10. In various embodiments, the notification system 18 is in communication with or is part of a vehicle security and notification system such as OnStar™, for example and without limitation. In various embodiments, the notification is provided to a driver, passenger, or occupant of the vehicle 10 or is provided to a remote operator or autonomous driving system.

The controller 22 is also in communication with one or more vehicle sensors 28. The one or more vehicle sensors 28 may include GPS, RADAR, LIDAR, optical cameras, thermal cameras, ultrasonic sensors, vehicle speed sensors, tire pressure sensors, and/or additional sensors as appropriate.

Figure 3:
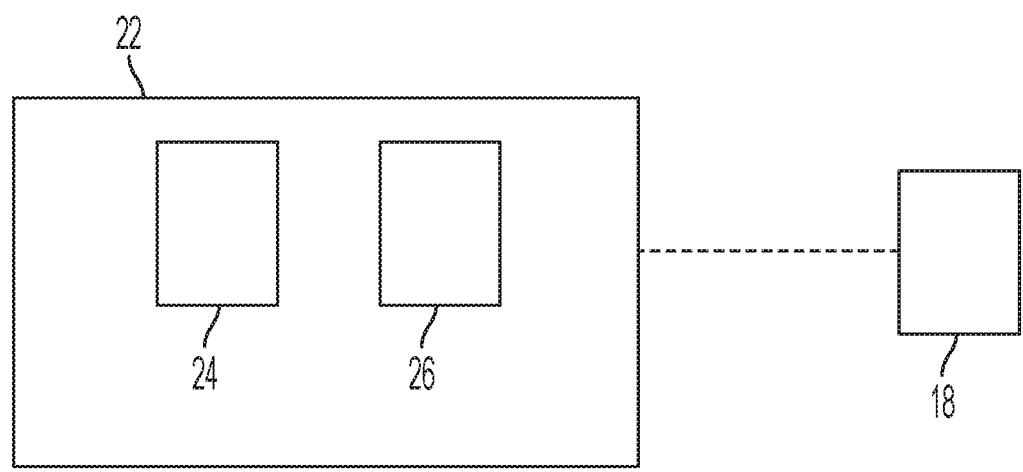
FIG. 3 is a schematic block diagram of a control system for a vehicle, according to an embodiment.

With reference to FIG. 3, the controller 22 is illustrated in a schematic block diagram. In various embodiments, the controller 22 includes a receiver 24 configured to receive AM signals. The controller 22 also includes at least one analysis module 26. The analysis module 26 is configured to analyze the signals received by the receiver 24 and, using information from the one or more vehicle sensors 28, determine whether a foreign object is embedded in a tread of the tire 15. In various embodiments, the controller 22 generates a control signal that is transmitted to the notification system 18 to notify the vehicle operator of an embedded object in the tire 15.

Figure 4:
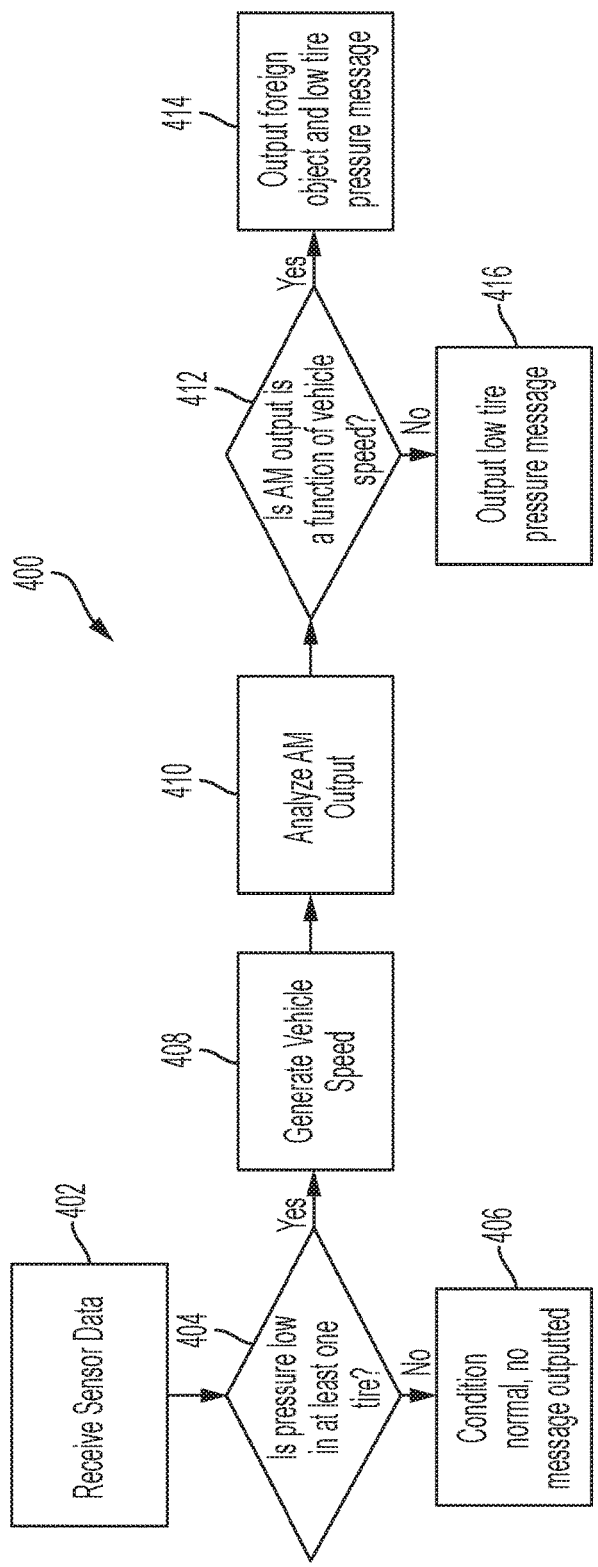
FIG. 4 is a flowchart representation of a method for controlling a vehicle, according to an embodiment.

FIG. 4 is a flowchart diagram of a method 400 of controlling a vehicle, according to an embodiment. The method 400 can be utilized in connection with the controller 22 of the vehicle 10, as discussed herein, or by other systems associated with or separate from the vehicle, in accordance with exemplary embodiments. The order of operation of the method 400 is not limited to the sequential execution as illustrated in FIG. 4, but may be performed in one or more varying orders, or steps may be performed simultaneously, as applicable in accordance with the present disclosure.

Beginning at 402, the controller receives sensor data from the one or more vehicle sensors. In various embodiments, the sensor data includes data regarding the speed of the vehicle 10, a pressure of any or all of the tires 15, and one or more AM signals. Next, at 404, the controller determines whether a first condition is satisfied. In various embodiments, the first condition is satisfied when the sensor data indicates a low pressure in at least one tire.

If the first condition is not satisfied, that is, the sensor data does not indicate a low tire pressure condition in any of the tires, the method 400 proceeds to 406. From 406, in various embodiments, the method 400 can repeat from block 402, as discussed herein.

If the first condition is satisfied, that is, the sensor data indicates a low pressure condition in at least one tire, the method 400 proceeds to 408. At 408, the controller generates the vehicle speed. The vehicle speed can be generated from sensor data received from the one or more sensors 28 or by any other means using vehicle state data. Next, at 410, the controller analyzes the AM signal received by the receiver. The controller analyzes the AM signal received over a predetermined time period and compares the signal to the vehicle speed and the tire size to determine whether the AM signal matches with the signal that would be expected when a foreign object is embedded in the tire tread of one of the tires. In various embodiments, multiple AM signals are received if foreign objects are embedded in two or more tires. In this scenario, the controller is configured to analyze and separate the AM signals into separate signals.

At 412, the controller determines whether a second condition is satisfied. In various embodiments, the second condition is satisfied if the controller determines that the analyzed signal is a function of vehicle speed. If the second condition is satisfied, that is, the AM signal is a function of the vehicle speed, the method 400 proceeds to 414. At 414, the controller generates a control signal and transmits the control signal to the notification system 18 to generate a notification indicating a detected foreign object in one or more of the tires, as well as a low tire pressure message. In some embodiments, the control signal directs the notification system 18 to display a message to the operator, play a sound, trigger a haptic feedback, or any other means of notifying the operator of the condition. In various embodiments, the control signal directs the notification system 18 to transmit a notification to a remote vehicle operator or to an autonomous driving system of the vehicle.

If the second condition is not satisfied, that is, the controller determines that the AM signal is not a function of the vehicle speed, the method 400 proceeds to 416. At 416, the controller generates a control signal and transmits the control signal to the notification system 18 to generate notification indicating a low tire pressure condition in one or more of the tires. However, in this scenario, the cause of the low tire pressure condition is unknown. In some embodiments, the control signal directs the notification system 18 to display a message to the operator, play a sound, trigger a haptic feedback, or any other means of notifying the operator of the condition. In various embodiments, the control signal directs the notification system 18 to transmit a notification to a remote vehicle operator or to an autonomous driving system of the vehicle. In various embodiments, the method 400 may repeat following steps 414 and 416 as discussed herein, or it may end.

Figure 5:
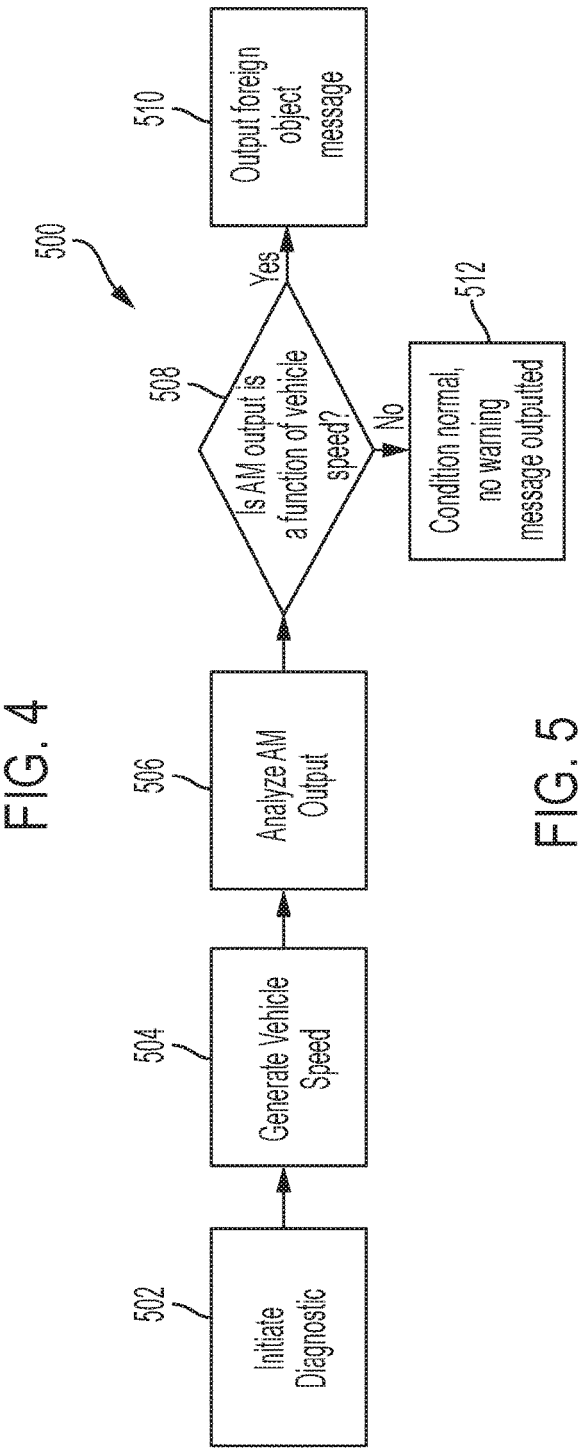
FIG. 5 is a flowchart representation of a method for controlling a vehicle, according to another embodiment.

A flow chart representation of another method 500 of controlling a vehicle 10 is illustrated in FIG. 5. The method 500 can be utilized in connection with the controller 22 of the vehicle 10, as discussed herein, or by other systems associated with or separate from the vehicle, in accordance with exemplary embodiments. The order of operation of the method 500 is not limited to the sequential execution as illustrated in FIG. 5, but may be performed in one or more varying orders, or steps may be performed simultaneously, as applicable in accordance with the present disclosure.

Beginning at 502, the controller initiates a diagnostic routine. In various embodiments, the diagnostic routine is initiated by an input received from the operator or is performed at a predetermined interval or is triggered based on a predetermined sensed condition. Also at 502, the controller receives sensor data from the one or more vehicle sensors. In various embodiments, the sensor data includes data regarding the speed of the vehicle 10, a pressure of any or all of the tires 15, and one or more AM signals.

Next, at 504, the controller generates the vehicle speed. The vehicle speed can be generated from sensor data received from the one or more sensors 28 or by any other means using vehicle state data. At 506, the controller analyzes the AM signal received by the receiver. The controller analyzes the AM signal received over a predetermined time period and compares the signal to the vehicle speed and the tire size to determine whether the AM signal matches with the signal that would be expected when a foreign object is embedded in the tire tread of one of the tires. In various embodiments, multiple AM signals are received if foreign objects are embedded in two or more tires. In this scenario, the controller is configured to analyze and separate the AM signals into separate signals.

At 508, the controller determines whether a first condition is satisfied. In various embodiments, the first condition is satisfied if the controller determines that the analyzed signal is a function of vehicle speed. If the first condition is satisfied, that is, the AM signal is a function of the vehicle speed, the method 500 proceeds to 510. At 510, the controller generates a control signal and transmits the control signal to the notification system 18 to generate a notification indicating a detected foreign object in one or more of the tires. In some embodiments, the control signal directs the notification system 18 to display a message to the operator, play a sound, trigger a haptic feedback, or any other means of notifying the operator of the condition. In various embodiments, the control signal directs the notification system 18 to transmit a notification to a remote vehicle operator or to an autonomous driving system of the vehicle.

If the first condition is not satisfied, that is, the controller determines that the AM signal is not a function of the vehicle speed, the method 500 proceeds to 512 and ends. Since the AM signal has been determined not to be a function of the vehicle speed, the controller does not generate a control signal for the notification system as there is no foreign object condition detected in the tire. In various embodiments, the method 500 may repeat following steps 510 and 512 as discussed herein, or it may end.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural references unless the context dearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling an automotive vehicle, the automotive vehicle including at least one tire and a notification system, the method comprising:
   detecting, via at least one sensor, sensor data indicative of a vehicle operating characteristic, the vehicle operating characteristic including vehicle speed data of a vehicle speed of the automotive vehicle;
   receiving, via a receiver, AM signals, the receiver configured to output AM signal data indicative of the AM signals;

receiving, via a controller in electronic communication with the at least one sensor, the receiver, and the notification system, the sensor data from the at least one sensor and the AM signal data from the receiver;

determining, by the controller, whether a first condition is satisfied;

analyzing, by the controller in response to the first condition being satisfied, the sensor data and the AM signal data, the analyzing including comparing the AM signal data to the vehicle speed data over a predetermined time period;

determining, by the controller, whether a second condition is satisfied; and generating, by the controller in response to the second condition being satisfied, a first control signal to control the notification system to generate a notification.

2. The method of claim 1, wherein the at least one sensor includes a first sensor configured to generate first sensor data and a second sensor configured to generate second sensor data, and the first sensor is a vehicle speed sensor configured to generate the vehicle speed data and the second sensor is a tire pressure sensor configured to generate tire pressure data.

3. The method of claim 2, wherein the first condition is satisfied when the tire pressure data indicates that a tire pressure of the at least one tire is below a predetermined threshold.

4. The method of claim 2, further comprising, in response to the second condition not being satisfied, generating, by the controller, a second control signal to control the notification system to generate a low tire pressure notification to an operator of the automotive vehicle.

5. The method of claim 2, wherein the first control signal controls the notification system to generate the notification notifying an operator of the automotive vehicle of a detected foreign object in the at least one tire.

6. The method of claim 1, wherein comparing the AM signal data to the vehicle speed data includes: determining if the AM signal data contains a periodic signal, and determining if a periodicity of the periodic signal at the vehicle speed indicates a foreign object is embedded in the at least one tire.

7. The method of claim 1, wherein the second condition is satisfied when the AM signal data is a function of the vehicle speed indicated by the vehicle speed data.

8. A method of performing a diagnostic test on a vehicle having a tire and a notification system, the method comprising:

detecting, via a sensor, sensor data indicative of a vehicle operating characteristic, the vehicle operating characteristic including vehicle speed data of a vehicle speed of the vehicle;

receiving, via a receiver, AM signals, the receiver configured to output AM signal data indicative of the AM signals;

receiving, via a controller in electronic communication with the sensor, the receiver, and the notification system, the sensor data from the sensor and the AM signal data from the receiver;

analyzing, by the controller, the sensor data and the AM signal data, the analyzing including comparing the AM signal data to the vehicle speed data over a predetermined time period;

determining, by the controller, whether a first condition is satisfied; and generating, by the controller in response to the first condition being satisfied, a first control signal to control the notification system to generate a notification.

9. The method of claim 8, wherein the sensor includes a vehicle speed sensor configured to generate the vehicle speed data.

10. The method of claim 8, wherein comparing the AM signal data to the vehicle speed data includes: determining if the AM signal data contains a periodic signal, and determining if a periodicity of the periodic signal at the vehicle speed indicates a foreign object is embedded in the tire.

11. The method of claim 8, wherein the first condition is satisfied when the AM signal data is a function of the vehicle speed indicated by the vehicle speed data.

12. The method of claim 8, wherein the first control signal controls the notification system to generate the notification indicative of a detected foreign object in the tire.

13. A system for detecting a foreign object embedded in a tire tread of a tire of a vehicle, the system comprising:

a sensor configured to detect a vehicle operating characteristic, the vehicle operating characteristic including vehicle speed data of a vehicle speed of the vehicle;

a receiver AM signals and output AM signal data indicative thereof;

a notification system; and a controller in electronic communication with the sensor, the receiver, and the notification system, the controller configured to:

receive the sensor data from the sensor and the AM signal data from the receiver;

analyze the sensor data and the AM signal data by comparing the AM signal data to the vehicle speed data over a predetermined time period;

determine whether a first condition is satisfied; and in response to the first condition being satisfied, generate a control signal to control the notification system to generate a notification.

14. The system of claim 13, wherein the controller is further configured to:

determine whether a second condition is satisfied; and in response to the second condition being satisfied, generate the control signal to control the notification system to generate the notification.

15. The system of claim 14, wherein the notification is transmitted to one or more of a vehicle operator, a vehicle passenger, a remote vehicle operator, and an autonomous driving system.

16. The system of claim 14, wherein the second condition is satisfied when the AM signal data is a function of the vehicle speed indicated by the vehicle speed data.

17. The system of claim 13, wherein the first condition is satisfied when tire pressure data indicates that a tire pressure of the at least one tire is below a predetermined threshold.

18. The system of claim 13, wherein the sensor includes a vehicle speed sensor configured to generate the vehicle speed data and a tire pressure sensor configured to generate tire pressure data.

19. The system of claim 13, wherein comparing the AM signal data to the vehicle speed data includes:

determining if the AM signal data contains a periodic signal; and determining if a periodicity of the periodic signal at the vehicle speed indicates a foreign object is embedded in the tire.

20. The system of claim 13, wherein the sensor, the receiver, the notification system, and the controller are configured to attach to a body of the vehicle.

\* \* \* \* \*